H. D. PERKY, DEC'D.
L. SPARKS, ADMINISTRATOR.
MACHINE FOR MANUFACTURING GRAIN INTO FORM FOR FOOD.
APPLICATION FILED MAR. 15, 1906.
1,147,263.
Patented July 20, 1915.
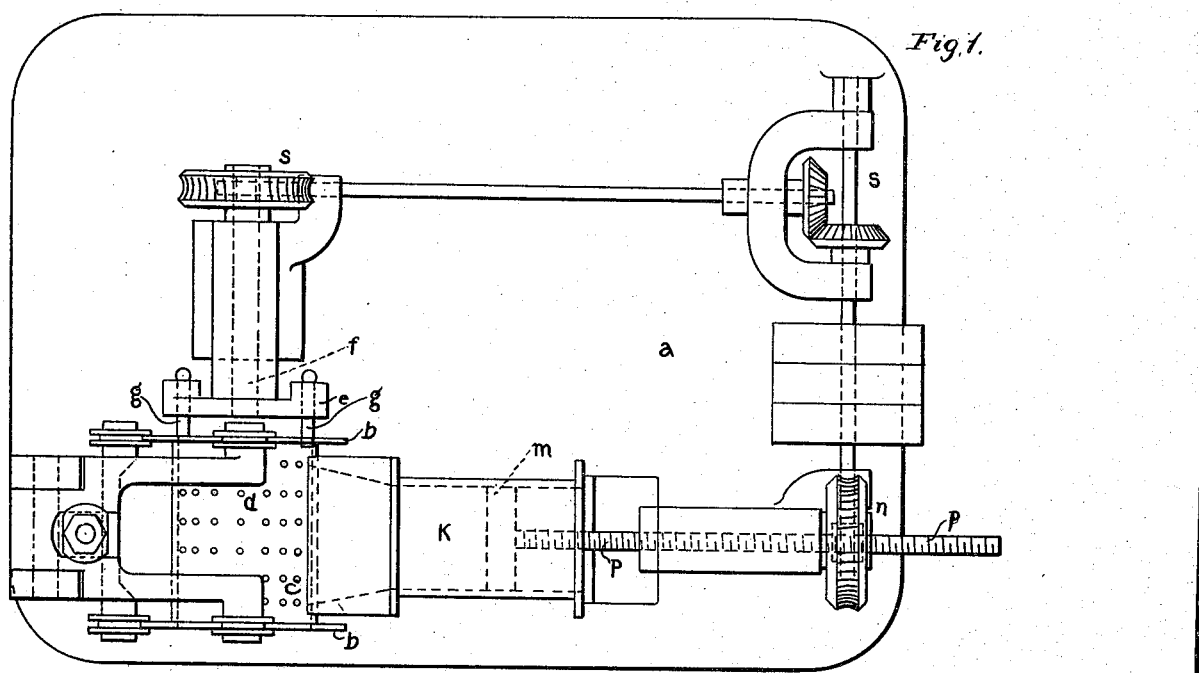
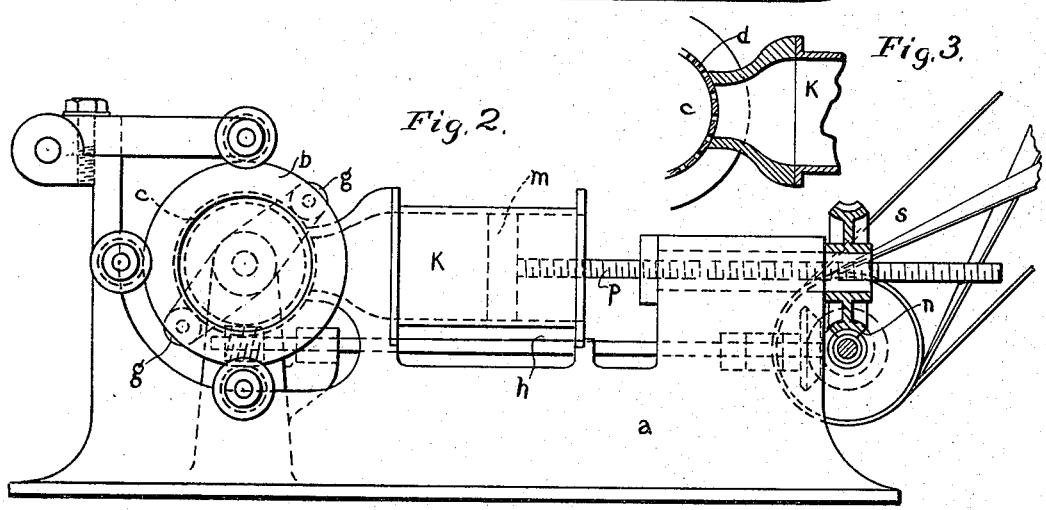
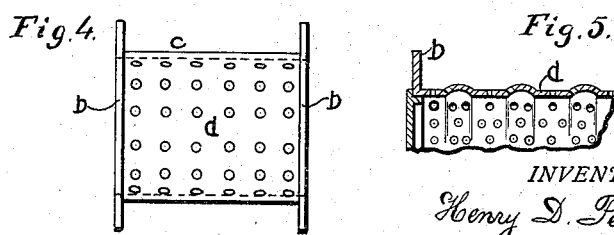
WITNESSES:
George M. Anderson
Stuart Hilder
INVENTOR.
Henry D. Perky
BY E. W. Anderson
his ATTORNEY.

UNITED STATES PATENT OFFICE.

HENRY D. PERKY, OF GLENCOE, MARYLAND; LABAN SPARKS, ADMINISTRATOR OF SAID HENRY D. PERKY, DECEASED, ASSIGNOR, BY MESNE ASSIGNMENTS, TO THE SHREDDED WHEAT COMPANY, OF NIAGARA FALLS, NEW YORK.

MACHINE FOR MANUFACTURING GRAIN INTO FORM FOR FOOD.

1,147,263.      Specification of Letters Patent.      Patented July 20, 1915.

Application filed March 15, 1906. Serial No. 306,050.

*To all whom it may concern:*

Be it known that I, HENRY D. PERKY, a citizen of the United States, and resident of Glencoe, in the county of Baltimore and State of Maryland, have made a certain new and useful invention in Machines for Manufacturing Grain into Form for Food; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view. Fig. 2 is a side view, partly in section. Fig. 3 is a sectional detail view. Fig. 4 is a side view of perforated cylinder. Fig. 5 is a sectional detail view of the cylinder.

The invention has relation to machines for the reduction of cereals to filamentous form for food, and it consists in the novel construction and combination of parts.

The object of the invention is to provide a convenient and economical machine for the purpose, wherein the forming cylinder is designed to serve as a drying receptacle.

In the accompanying drawings, illustrating the invention, the letter $a$, designates framework, supporting the parts of the machine, and provided with bearings for a rotary reducing cylinder $c$, having a perforated cylindrical wall $d$. This cylinder, open at both ends, is driven by means of a head $e$, provided with a journal $f$, to which is secured a gear wheel or pulley for power attachment. Each end of the reducing cylinder is provided with an external circular flange, and the cylinder is designed to be removable from its bearings in the frame, so that it may be rolled from place to place. It is removably engaged by means of a lug $g$, with the head $e$, in order that it may be rotated thereby when the machine is in operation.

The machine is provided with one or more press devices, radially arranged with reference to the cylinder and opening toward the cylindrical surface thereof. Each of such devices is provided with a seat $h$, for the reception of the material, which should be inclosed in a holding cylinder $k$, open at both ends.

The material usually consists of grain, deprived of the outer hull, ground and cooked in a vessel closed in water-tight manner, in boiling water or steam. The material in the vessel is mixed with about its bulk of water, or the proper quantity to be all taken up in the cooking, so that the cooked product will be of solid form, or consistency. The vessel in which it is cooked may be a cylinder having removable caps or ends, and such vessel may constitute the press cylinder. The follower $m$, of the press is of proper size to enter the cylinder and is driven by means of slow gearing $n$, in connection with the follower rod $p$, which is radial to the perforated cylinder.

The perforated wall of the cylinder $c$, is designed to be usually beaded or bent to provide ridges at intervals, thereby raising the edges of some of the perforations to different heights.

The material being pressed against the reducing cylinder, while the latter is in rotation through the operation of gearing $s$, passes through the perforations of the wall of this cylinder, forming elongated accretions or jointed sprays or tendrils, which accumulate in the cylinder until it is charged. The cylinder is then removed from its seat in the frame, and rolled or otherwise taken to an oven or hot air chamber, where the manufacturer is completed by drying the sprays or filaments, which can then be discharged from the cylinder through its open end ready for packing in cartons.

Having described the invention, what I claim and desire to secure by Letters Patent is—

1. A machine for reducing grain, having a removable hollow open-end receiving cylinder provided with end flanges of equal diameter and having perforations in its cylindrical wall adapted to reduce the material to filamentous form within the cylinder, bearings for said flanges, a rotary drive-head, means of engagement of the cylinder flange to said drive-head, a feed press radial to said cylinder, and means for simultaneously operating said cylinder and said feed press.

2. In a machine for reducing grain, a removable hollow open-end receiving cylinder provided with perforations in its cylindrical wall, and circular end flanges, rotary bearings engaging said flanges, a feed press normal to the cylindrical wall, and rotary means including screw gearing for operating said feed press and said cylinder.

3. In a machine for reducing cooked grain, a rotary hollow container having perforations in its side walls, a feed chamber adjacent to said container, a pressure device in said feed chamber, and means for simultaneously rotating said container and moving said pressure device.

4. In a machine for reducing cooked grain, a rotary hollow container having perforations in its side walls, a feed chamber adjacent to said container, a pressure device in said feed chamber, and means for simultaneously rotating said container and moving said pressure device, the edges of said perforations being adapted to cut successive portions from the mass of cooked grain in the feed chamber to form elongated jointed accretions accumulating in said container until it is charged.

5. In a machine for reducing cooked grain, a rotary hollow container having perforations in its side walls, a drive shaft for said container having a head removably engaging the container, a feed chamber adjacent to the container, a piston in said feed chamber, having a rod located at right angles to said shaft, a power shaft, and means connected with said power shaft for simultaneously rotating said drive shaft and moving said rod step by step.

In testimony whereof I affix my signature, in presence of two witnesses.

HENRY D. PERKY.

Witnesses:
  WM. C. BREED,
  L. S. BURBANK.

Copies of this patent may be obtained for five cents each, by addressing the "Commissioner of Patents, Washington, D. C."